Figure 1:
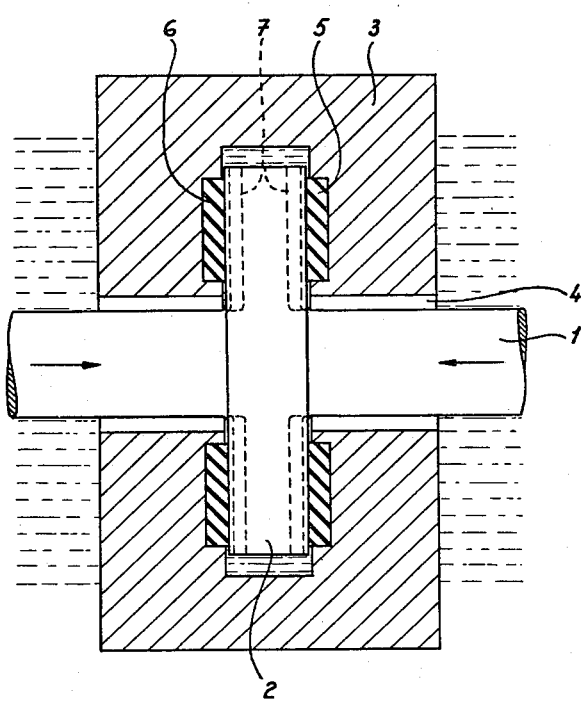

United States Patent [19]

Visser

[11] 4,362,343
[45] Dec. 7, 1982

[54] AXIAL BEARING

[75] Inventor: Teunis Visser, Sliedrecht, Netherlands

[73] Assignee: IHC Holland N.V., Papendrecht, Netherlands

[21] Appl. No.: 254,983

[22] Filed: Apr. 16, 1981

[30] Foreign Application Priority Data

Apr. 18, 1980 [NL] Netherlands ............... 8002281

[51] Int. Cl.³ .............................................. F16C 17/04
[52] U.S. Cl. .................................... 308/170; 308/26; 308/238
[58] Field of Search ............... 308/170, 238, DIG. 15, 308/26, 9, 122, DIG. 8; 277/95

[56] References Cited

U.S. PATENT DOCUMENTS 3,713,659 1/1973 Derman et al. ................. 277/95
4,325,583 4/1982 McHugh ......................... 308/9
4,326,758 4/1982 Nozue et al. ................... 308/170

FOREIGN PATENT DOCUMENTS 2048747 9/1972 Fed. Rep. of Germany .
614035 2/1926 France .
1162328 11/1958 France .
6617168 10/1968 Netherlands .
6704587 10/1968 Netherlands .
960152 6/1964 United Kingdom .

Primary Examiner—Lenard A. Footland
Attorney, Agent, or Firm—Young & Thompson

[57] ABSTRACT

The invention relates to an axial bearing comprising a shaft 1 with a disc 2, said disc having grooves 7 and cooperates with a stationary disc 5,6 made from elastomeric material the bearing being based upon the principle that the flank 8 or flanks 8,9 of the groove 7 under all circumstances from stand still to motion at full speed deform the smooth surface of elastomeric material and form a lubricating wedge.

2 Claims, 5 Drawing Figures

AXIAL BEARING

The invention relates to an axial bearing consisting of a disc provided with grooves mounted on the shaft and a stationary ring-shaped disc in a house. Such an axial bearing is known for instance from the Dutch Patent Application 67.04587, laid open to the public. This known hydrodynamic bearing includes on the rotating disc a number of essentially spirally shaped shallow grooves excerting a pumping action and consequently forming a lubricating layer between the disc and the stationary ring.

Such axial bearings are less well suited for absorbing heavy axial loads, require high numbers of revolutions and are not suitable when the lubricating medium may include contaminations.

The object of the invention is to provide an axial bearing not subject to the above drawbacks.

In accordance with the invention the object is achieved in that the disc consists of an elastomeric material and that the grooves have at least one flank at a small angle with the surface of the disc, the opening of said angle being directed in the direction of rotation. In case of the bearing according to the invention the grooves will also cause a pumping action, that is to say they will cause a conveyance of the lubricating medium through the grooves of the disc. The build-up of pressure is caused by the wedge shaped angle, a principle known per se for axial bearings including adjustable slide blocks.

In the bearing according to the invention however due to the cooperation of the surface of the disc provided with grooves having slightly sloping flanks with the elastomeric disc there will occur a deformation in this disc whereby the wedge angle will become yet smaller, this being conducive to a more rapid and more efficient build-up of the lubricating wedge during starting up and to the retention of the lubricating action upon impact loads. Moreover a simple lubricant such as water, may be utilized whereby it is not objectional if this water is somewhat contaminated, for the combined action of the elasticity of the elastomeric material and the flushing action of the grooves provide for a continuous flow, cleaning and cooling.

It should be noted that from the Dutch Patent Application 75.04176 laid open to public inspection an axial bearing is known consisting of a smooth disc mounted on the shaft and a number of metal slide blocks arranged along a rim and supported in a house which slide blocks are mounted in a tilting manner in the house by means of an elastomeric material. In this case the elastomeric material does not function as a bearing material but for tilting the slide blocks in order to allow the formation of the lubrication wedge.

According to the invention both the flanks of the groove may be at a small opposite angle with the plane of the disc. Such an axial bearing is suitable for both directions of rotation.

The grooves may run radially or may have any other suitable course. In the root of the grooves there may be provided recesses for allowing a larger flow of medium.

Figure 2:
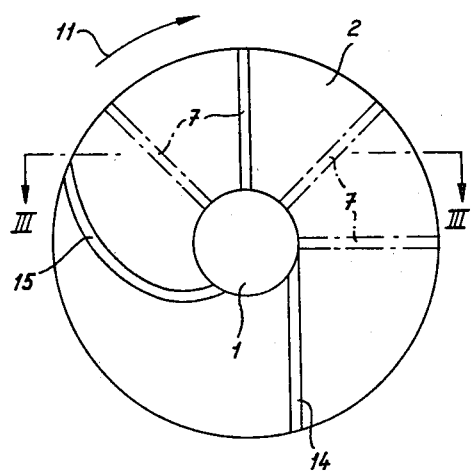
Figure 3:
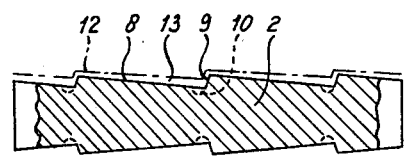
Figure 4:
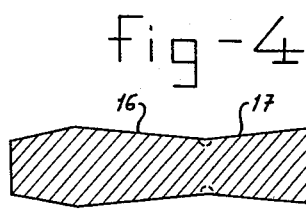
Figure 5:
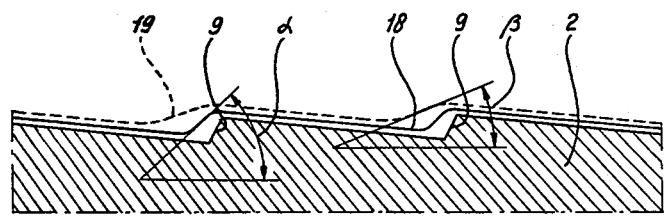

The invention will now be elucidated in further detail with reference to the drawings, in which FIG. 1 diagrammatically shows a cross sectional view of the bearing according to the invention, FIG. 2 shows a side elevation of the bearing disc, while representing three possible courses along which the grooves may run, FIG. 3 represents a cross section of the disc of FIG. 2 along the line III—III, FIG. 4 represents a similar cross section like FIG. 3 of a variation thereof, and FIG. 5 shows the principle of the bearing.

With reference to FIG. 1 there is shown a shaft 1 including a disc 2 mounted fixedly on said shaft.

This shaft 1 and disc 2 are axially supported in a house 3 surrounding the shaft at a clearance 4.

At either side of the disc 2 there are elastomeric discs 5 and 6 mounted fixedly in the house. They possess a flat surface facing the disc 2.

The faces of the disc cooperating with the elastomeric rings 5 and 6 are provided with grooves 7 running from the shaft to the circumference. The bearing is shown rotating in a liquid medium, for instance water, that consequently may enter freely between the disc and the elastomeric discs by way of the grooves.

FIG. 2 shows a side elevation of the disc 2. A number of radially running grooves are represented therein which grooves will of course be provided on the entire surface of the disc if such grooves are employed.

FIG. 3 shows a cross sectional view of the disc while representing the course of the groove and showing that each groove posseses a rising flank 8 and a descending flank 9 whereas in the root of the grooves there may yet be provided conveying grooves 10.

Upon rotating in a direction to the right in FIG. 2 like indicated by the arrow 11 and upon being loaded axially there will be caused a deformation in the face of the elastomeric ring 5 or 6 indicated by the interrupted line 12 whereby a small wedge angle 13 is formed between the ring and the rising flanks 8 when the shaft starts rotating. Once this shaft is in rotation the elastomeric face will be deformed somewhat less due to the inertness of the elastomeric material whereby the wedge angle become somewhat smaller.

With reference to FIG. 2 it has been shown that the groove may also run along a line 14 tangential to the shaft or according to the spiral-shaped line 15.

With reference to FIG. 4 there is shown a profile for both directions of rotation. The grooves consequently possess two flanks 16 and 17 both slightly sloping in the same but opposite way.

With reference to FIG. 5 there is shown the one side of the disc 2 on a enlarged scale.

In resting condition the elastomeric material of for instance the disc 5 will be deformed like indicated by the full line 18. The wedge angle will then be formed close to the rising flank 9.

When rotating the deformation will run along the interrupted line 19 and the wedge angle $\beta$ will thus be smaller.

This pattern of deformation will move together with the disc.

I claim:

1. An axial bearing consisting of a rotary disc provided with grooves mounted on a shaft and a stationary ring-shaped disc in a house characterized in that the stationary disc consists of elastomeric material and that the grooves have at least one flank at a small angle with the surface of the stationary disc, the opening of said angle being directed in the direction of rotation.

2. The axial bearing according to claim 1 characterized in that both the flanks of the grooves are at a small but opposite angle with the plane of the disc.

* * * * *